United States Patent [19]
Harima et al.

[11] Patent Number: 5,518,195
[45] Date of Patent: May 21, 1996

[54] CASE LOADING DEVICE HAVING IMPROVED CASE EJECTING FUNCTION

[75] Inventors: Masahiro Harima; Ikuichiro Nawa; Keiichi Setsumasa, all of Kanagawa, Japan

[73] Assignee: Mitsumi Electric Co., Ltd., Japan

[21] Appl. No.: 251,383

[22] Filed: May 27, 1994

[30] Foreign Application Priority Data

Jul. 27, 1993 [JP] Japan ................ 5-040893 U

[51] Int. Cl.$^6$ ........................... G11B 15/675
[52] U.S. Cl. .................................. 242/339
[58] Field of Search ................ 242/335, 338, 242/338.4, 339; 360/93, 96.5

[56] References Cited

U.S. PATENT DOCUMENTS

| | | | |
|---|---|---|---|
| 4,184,185 | 1/1980 | Yakame | 242/339 |
| 4,259,701 | 3/1981 | Pera | 242/339 |
| 4,564,874 | 1/1986 | Schijven | 242/339 |
| 4,661,867 | 4/1987 | Tsubota | 242/339 |
| 4,723,236 | 2/1988 | Kitami | 360/93 |
| 4,802,039 | 1/1989 | Hatanaka | 360/93 |
| 5,021,904 | 6/1991 | Shimizu et al. | 360/96.5 |
| 5,060,094 | 10/1991 | Chung et al. | 242/338.4 |
| 5,084,792 | 1/1992 | Watanabe | 360/93 |
| 5,088,655 | 2/1992 | Nakanishi | 242/335 |

*Primary Examiner*—John P. Darling
*Attorney, Agent, or Firm*—Ladas & Parry

[57] ABSTRACT

A holder mechanism unit holds a case. A driving mechanism unit drives the holder mechanism unit so as to cause the holder to convey the case between a first position and a second position. An arm moves the case from the second position to a third position which is located on the opposite side of the second position to the first position as a result of being driven by the driving mechanism unit. An arm driving member drives the arm to move the case from the second position to the third position as a result of being driven by the driving mechanism unit.

10 Claims, 7 Drawing Sheets

CASE LOADING DEVICE HAVING IMPROVED CASE EJECTING FUNCTION

BACKGROUND OF THE INVENTION

1. Field of the Invention

The present invention relates to a case loading device which may comprise a tape-cassette loading device and such a tape-cassette loading device may comprise one used in a DAT (digital audio tape recorder).

2. Related Art

A tape-cassette loading device in the related art used in a rotary-drum type DAT is now described with reference to FIGS. 1 and 2. The tape-cassette loading device includes a chassis 71, holder driving mechanism unit 74 and holder 76.

The chassis 71 includes a top plate 71a, side plates 71b and 71c and long holes 71d and 71e are formed in the top plate 71a. Guide holes are formed in the side plates 71b and 71c, through which holes engaging pins 76e through 76h of the holder 76 and engaging pins 75c and 75d of the holder driving mechanism unit 74 pass.

The holder 76 includes a top plate 76a, side plates 76b and 76c and bottom plate facing the top plate 76a and forms a frame like housing. The engaging pins 76e, 76f, 76g and 76h project from the side plates 76b and 76c.

The holder driving mechanism unit 74 includes a top plate 74a and side plates 74b and 74c and pins 75a and 75b project from the top plate 74a and are inserted into the long holes 71d and 71e formed in the chassis 71. The pins 75c and 75d respectively project from the side plates 74b and 74c and are inserted into the guide holes extending along the $D_1/D_2$ directions in the side plates 71b and 71c of the chassis 71. The above pins 75a, 75b, 75c and 75d support the holder driving mechanism unit 74 on the chassis 71 so that the holder driving mechanism unit 74 may move along the $D_1/D_2$ directions on the chassis 71.

Guiding holes are formed in the side plates 74b and 74c of the holder driving mechanism unit 74, through which holes the engaging pins 76e, 76f, 76g and 76h pass. The engagement of the engaging pins 76e through 76h with the corresponding guiding holes of the holder driving mechanism unit and with the corresponding guiding holes of the chassis 71 defines the position of the holder 76 on the holder driving mechanism unit 74 so that the position of the holder 76 cannot move on the holder driving mechanism unit 74 in the $D_1/D_2$ directions.

An ejecting arm 77 is rotatably supported on the top plate 74a of the holder driving mechanism unit 74 using a shaft 77a and an ejecting arm 81 is rotatably supported on the top plate 74a using a shaft 81a. Rollers 82a and 82b are respectively provided on tips of the ejecting arms 77 and 81 and a roller 83 is provided on the other tip of the ejecting arm 77.

A linkage plate 78 is rotatably supported on the ejecting arm 77 by means of a shaft 84 and is also rotatably supported on the ejecting arm 81 by means of a shaft 80. An end of a spring 79 is hooked on a hooking portion 78a of the linkage plate 78 and the other end of the spring 79 is hooked on a hooking portion 74d of the top plate 74a. The spring 79 pulls the linkage plate 78 in the $E_1$ direction so that, via the linkage plate 78, the ejecting arm 77 bears the force for rotating the arm 77 counterclockwise and the ejecting arm 81 bears the force for rotating the arm 81 clockwise.

A cut-out portion 72 for guiding the roller 83's movement is formed in the top plate 71a of the chassis 71.

An operation of the above tape-cassette loading device is now described. FIG. 1 shows a state of the device in which the rollers 82a and 82b are in contact with the front end (the lid portion) 30b of a tape cassette 30 and in the state where the tape-cassette has just started to be ejected from the holder 76. FIG. 2 shows a state of the device in which the ejection of the tape cassette 30 from the holder has been completed.

As shown in FIG. 2, the holder 76 is in the position where the holder 76 has moved in the $D_2$ direction as far as possible and this position is referred to as an inserting position with no tape cassette is loaded in the device. If an operator pushes the tape cassette 30 in the $D_1$ direction after inserting the cassette in the same direction into the holder 76, the cassette 30 is held in the holder 76 at a predetermined position.

During this period, the front edge 30b of the cassette 30 presses the rollers 82a and 82b of the ejecting arms 77 and 81 so as to rotate the ejecting arm 77 clockwise and to rotate the ejecting arm 81 counterclockwise. Thus, the roller 83 moves to come into contact with a preventing portion 72a.

Then, a holder driving motor is operated so that the holder mechanism unit 74 is driven by the motor in the $D_1$ direction, the holder 76 being accordingly driven to arrive at a loaded position.

The loaded position is a position where both the mechanism unit 74 and the holder 76 have moved as far as possible in the $D_1$ direction. While the holder 76 moves to and thus arrives at the loaded position, the ejecting arm 77 is rotated clockwise because the roller 83 of the ejecting arm 77 is guided by the cut-out portion 72, and the ejecting arm 81 is thus rotated counterclockwise via the linkage plate 78. Thus, both the rollers 82a and 82b lose contact with the front edge 30b of the cassette 30.

In order to eject the tape cassette which has been carried by the holder 76 to the holder's loaded position, the holder driving motor drives the holder driving mechanism unit 74 to move it in the $D_2$ direction. Accordingly, the holder 76 is also moved in the $D_2$ direction so as to arrive at the inserting position.

When the holder driving mechanism unit 74 arrives at the position shown in FIG. 1, the roller 83 of the ejecting arm 77 comes into contact with the preventing portion 72a. If the holder driving mechanism unit 74 is further moved in the $D_2$ direction, the roller 83 passes the preventing portion 72a. Then, while the roller 83 rolls on an arc portion 72b, the ejecting arm 77 is rotated counterclockwise due the pulling force of the spring 79 via the linkage plate 78 and the ejecting arm 81 is rotated clockwise accordingly.

The rollers 82a and 82b of the rotated ejecting arm 77 and 81 push the front edge 30b of the cassette 30 in the $D_2$ direction so that the cassette 30 is ejected from the holder 76. An engaging portion 74e stops the rotation of the ejecting arm 77 when an engaging portion 77b of the arm 77 comes into contact with the engaging portion 74e.

A tape-cassette loading device in the related art such as described above uses a spring's elastic force. The above described device uses the elastic force of the spring 79 for rotating the arm 77 and 81 so as to push out a tape cassette 30 from the holder 76.

However, because a spring's elastic force may vary among the products, the force is required to be large enough to push out the cassette 30 from the holder 76 against friction force preventing the cassette 30 from moving in the holder. Further, the force is required to be large enough to push the cassette 30 to move it by a predetermined distance from the holder so that an operator may reach the cassette 30 from outside to take it out. Such a large elastic force may push the cassette 30 unnecessarily suddenly and rapidly.

SUMMARY OF THE INVENTION

An object of the present invention is to provide a case loading device which has a capability of gently and smoothly ejecting a case and also has a sufficient case ejecting distance.

In order to achieve the above object of the present invention, a case loading device according to the present invention comprises:

a holder mechanism unit for holding a case;

a driving mechanism unit for driving said holder mechanism unit so as to cause said holder to convey said case between a first position and a second position; and an arm for moving said case from said second position to a third position which is located on the opposite side of said second position to said first position as a result of being driven by said driving mechanism unit.

In the above construction, since not only the holder mechanism unit but also the arm are driven by the driving mechanism unit, which may include a driving motor, the case may be moved by the arm from the second position, which may correspond to the above inserting position of the holder, to the third position. In particular in the case where a case loading device comprises a tape-cassette loading device for a DAT for example, the driving mechanism unit for operating the holder mechanism unit such as the above holder and holder driving mechanism unit should inherently include force generating means such as an electric motor to ensure accurate positioning of the tape cassette at its loaded position, the proper tape accessing state being thus achieved. By driving the arm through such a relatively superior driving mechanism unit as that using an electric motor (in particular, in comparison to a spring elastic force), the arm may thus push the case gently and smoothly to move by a distance, that is the distance between the second and third positions, which distance may be large enough so that an operator may easily take the case when the case is located at the third position.

Other objects and further features of the present invention will become more apparent from the following detailed description when read in conjunction with the accompanying drawings.

DESCRIPTION OF THE PREFERRED EMBODIMENT

Figure 1:
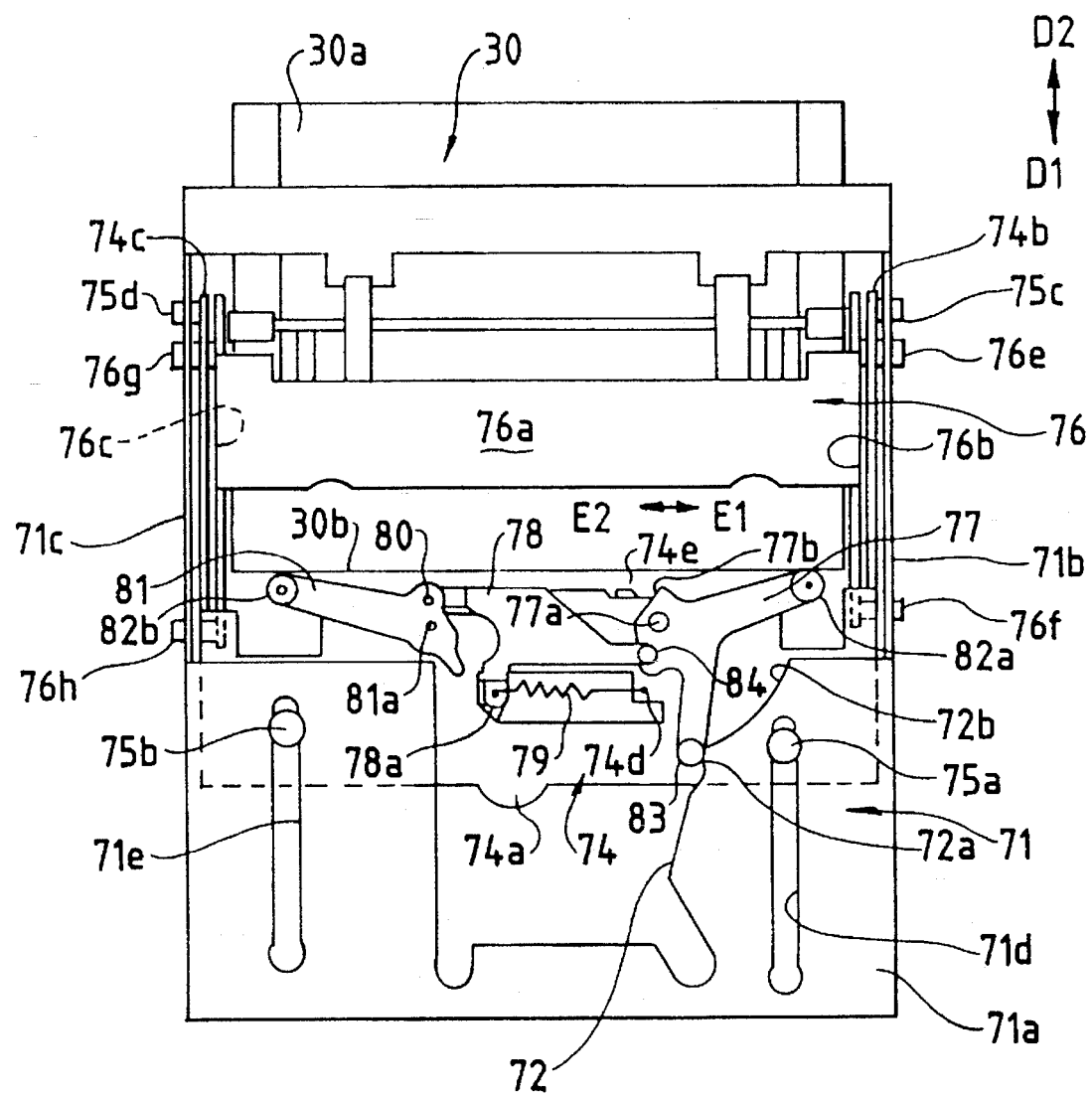
FIGS. 1 and 2 show plan views of a tape-cassette loading device in the related art.
Figure 2:
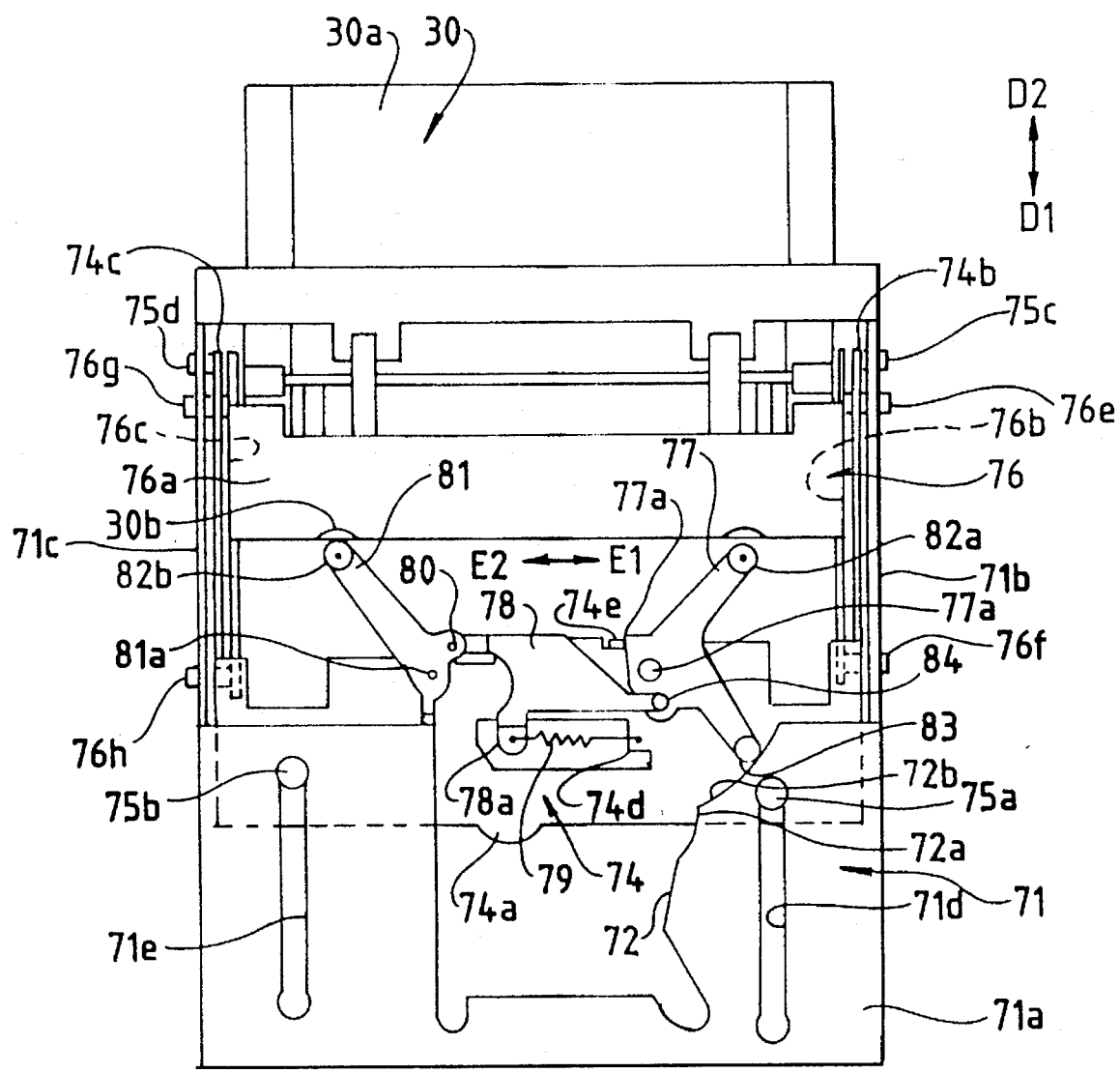
Figure 3:
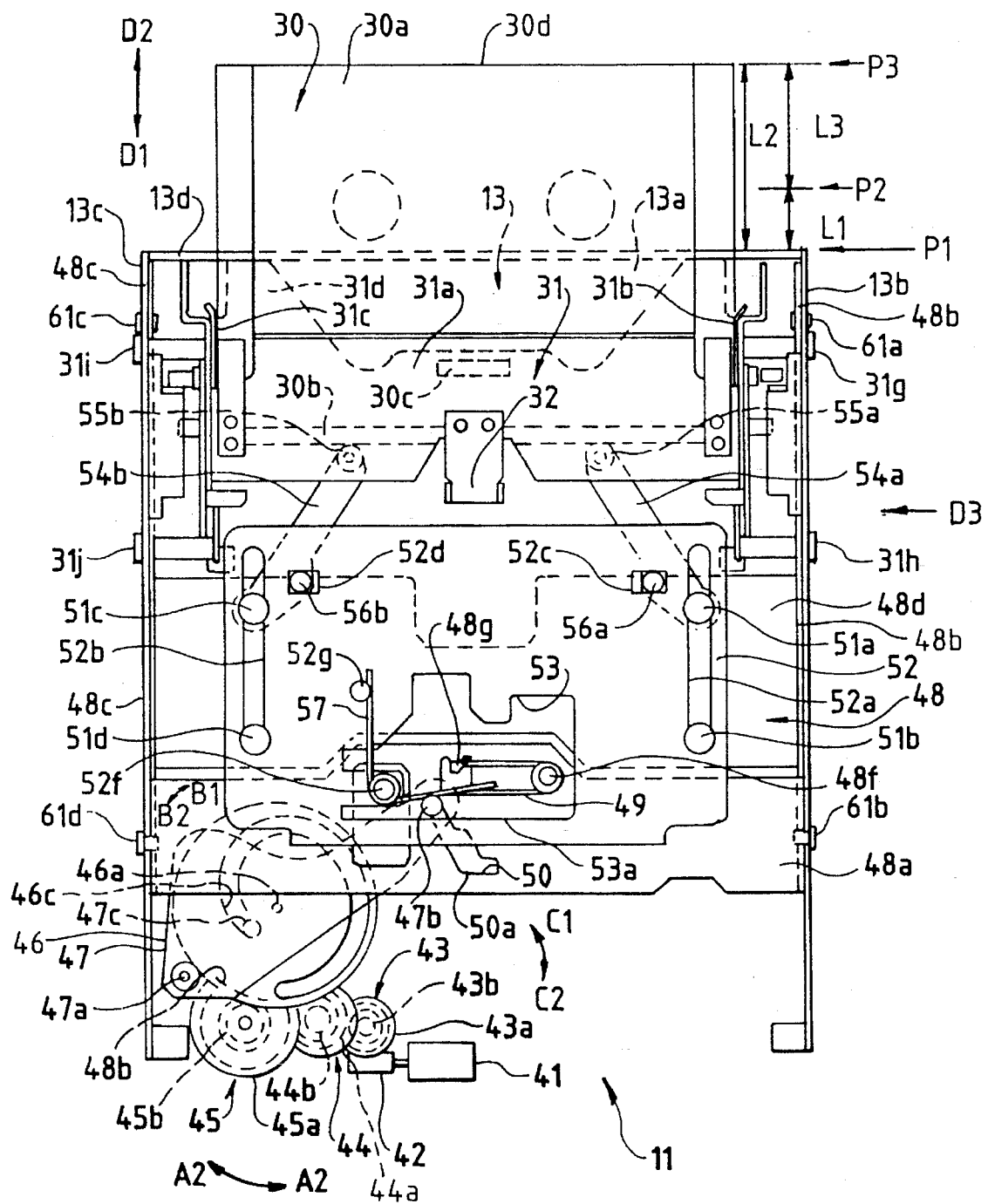
FIG. 3 shows a plan view of a tape-cassette loading device, used in a DAT, in an embodiment of the present invention.
Figure 4:
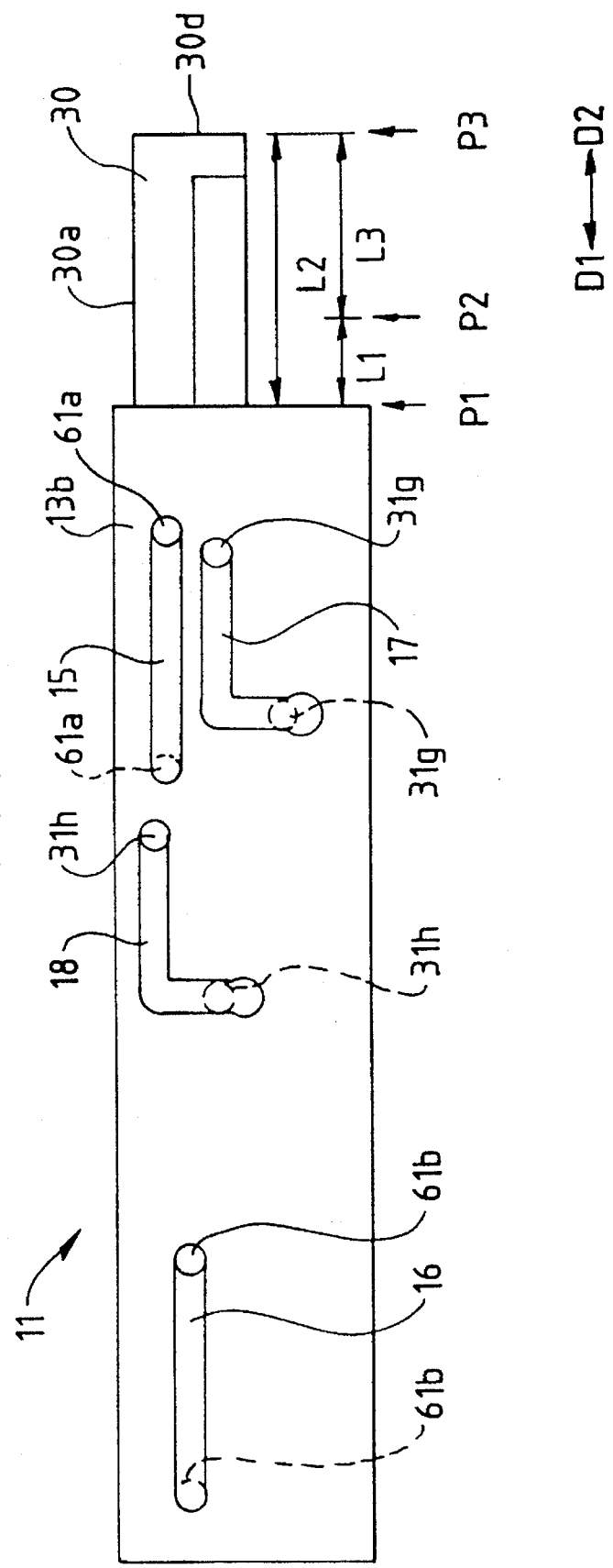
FIG. 4 shows a side elevation view of the device of FIG. 3 viewed in a $D_3$ direction.

With reference to FIGS. 3 and 4, a tape-cassette loading device 11 in an embodiment of a case loading device according to the present invention is now described. FIG. 3 shows the state of the tape-cassette loading device 11 where a tape cassette 30 has been ejected from the device 11. The device 11 is used in a DAT which writes information on/reads information from the magnetic tape contained in the tape cassette 30. The DAT includes a chassis 13 including a bottom plate 13a, side plates 13b and 13c and front plate 13d. Various components of the DAT such as a rotation drum, capstan, pinch roller, tape loading mechanism unit and so forth (not shown in the figures) as well as the relevant tape-cassette loading device 11 are installed on the chassis 13.

Guide holes 15, 16, 17 and 18 are formed on the side plate 13b of the chassis 13 as shown in FIG. 4. Engaging pins 31g and 31h of a holder 31 which will be described respectively pass through the guiding holes 17 and 18. Engaging pins 61a and 61b of a holder driving mechanism unit 48 which will also be described respectively pass through the guiding holes 15 and 16. Similarly, guide holes are formed on the opposite side plate 13c of the chassis 13, through which holes engaging pins 31i and 31j of the holder 31 and engaging pins 61c and 61d of the holder driving mechanism unit 48 pass.

The holder 31 of the tape-cassette loading device 11 includes a top plate 31a, side plates 31b and 31c and bottom plate 31d and forms a frame like housing.

The tape cassette 30 is inserted into the holder 31 in a direction $D_1$ shown in FIG. 3. A cassette pressing member 32 made of elastic material is provided in the top plate 31a of the holder 31 and presses the tape cassette 30 in the state where the cassette 30 lies in the holder 31 after being inserted thereto.

The engaging pins 31g, 31h, 31i and 31j project from the side plates 31b and 31c.

The holder driving mechanism unit 48 includes its housing including two top plates 48a and 48d, and side plates 48b and 48c formed in a unit body. Engaging pins 61a, 61b, 61c and 61d projecting from the side plates 48b and 48d pass through the corresponding guiding holes 15 and 16 of the side plate 13b and the corresponding guiding holes of the side plate 13c in the chassis 13. The engagement between the above engaging pins 61a, 61b, 61c and 61d and the corresponding guiding holes supports the holder driving mechanism unit 48, on the chassis 13, such that it is movable in the directions $D_1/D_2$.

Guiding holes through which the engaging pins 31g, 31h, 31i and 31j of the holder 31 respectively pass are formed in the side plates 48b and 48c of the holder driving mechanism unit 48. The engagement of the engaging pins 31g through 31j with the corresponding guiding holes of the holder driving mechanism unit 48 and with the corresponding guiding holes 17, 18 and the other corresponding guiding holes of the side plates 13b and 13c prevents the holder 31 from moving in either of the directions $D_1/D_2$ on the holder driving mechanism unit 48.

An ejecting arm 54a is supported on the top plate 48d of the holder driving mechanism unit 48 and rotates about a shaft 51a. An ejecting arm 54b is rotatably supported on the top plate 48d of the holder driving mechanism unit 48 and rotates about a shaft 51c. Rollers 55a and 55b are respectively provided on the free ends of the ejecting arms 54a and 54b.

A plate-shaped arm driver 52 is located on the top of the ejecting arms 54a and 54b and long holes 52a and 52b extending along the directions $D_1/D_2$ are formed in the driver 52. A pin 51b fixed on the top plate 48d of the holder driving mechanism unit 48 and the above shaft 51a of the ejecting arm 54a both pass through the long hole 52a. Similarly, a pin 51d fixed on the top plate 48d of the holder driving mechanism unit 48 and the above shaft 51c of the ejecting arm 54b both pass through the long hole 52b. The engagement of the above shafts 51a and 51c and pins 51b and 51d with the long holes 52a and 52b supports the arm driver 52, on the top plate 48d of the holder driving mechanism unit 48, so as to be movable in the directions $D_1/D_2$.

A hole 52c through which an engaging pin 56a projecting from the ejecting arm 54a passes and a hole 52d through which an engaging pin 56b projecting from the ejecting arm 54b passes are also formed in the arm driver 52.

The $D_2$-direction movement of the arm driver 52 on the holder driving mechanism unit 48 causes the holes 52c and 52d to respectively move the engaging pins 56a and 56b in the $D_2$ direction, the ejecting arm 54a being accordingly rotated clockwise and the ejecting arm 54b being accordingly rotated counterclockwise.

The $D_1$-direction movement of the arm driver 52 on the holder driving mechanism unit 48 causes the holes 52c and 52d to respectively move the engaging pins 56a and 56b in the $D_1$ direction, the ejecting arm 54a being accordingly rotated counterclockwise and the ejecting arm 54b being accordingly rotated clockwise.

A hole 53 is formed in the arm driver 52 so as to create a space for a spring supporter 48f and engaging pin 47b which will be described.

A hole 50 is formed in the top plate 48a of the holder driving mechanism unit 48. A driving arm 47 is rotatably supported below the same top plate 48a and rotates about a shaft 47a on the chassis 13. A pin 47b provided on the free end of the driving arm 47 passes through the hole 50.

The above spring supporter 48f is provided on the top plate 48a of the holder driving mechanism unit 48 and supports the coil part of a coil spring 49. A spring preventer 48g prevents an end of the coil spring 49 from moving in the $D_2$ direction and the engaging pin 47b of the driving arm 47 prevents the other end of the coil spring 49 from moving in the $D_1$ direction.

A spring holding pin 52f is provided on the arm driver 52 and supports the coil part of a coil spring 57. A spring preventer 52g provided on the arm driver 52 prevents an end of the coil spring 57 from moving leftward and the engaging pin 47b of the driving arm 47 prevents the other end of the coil spring 57 from moving in the $D_1$ direction.

Figure 5:
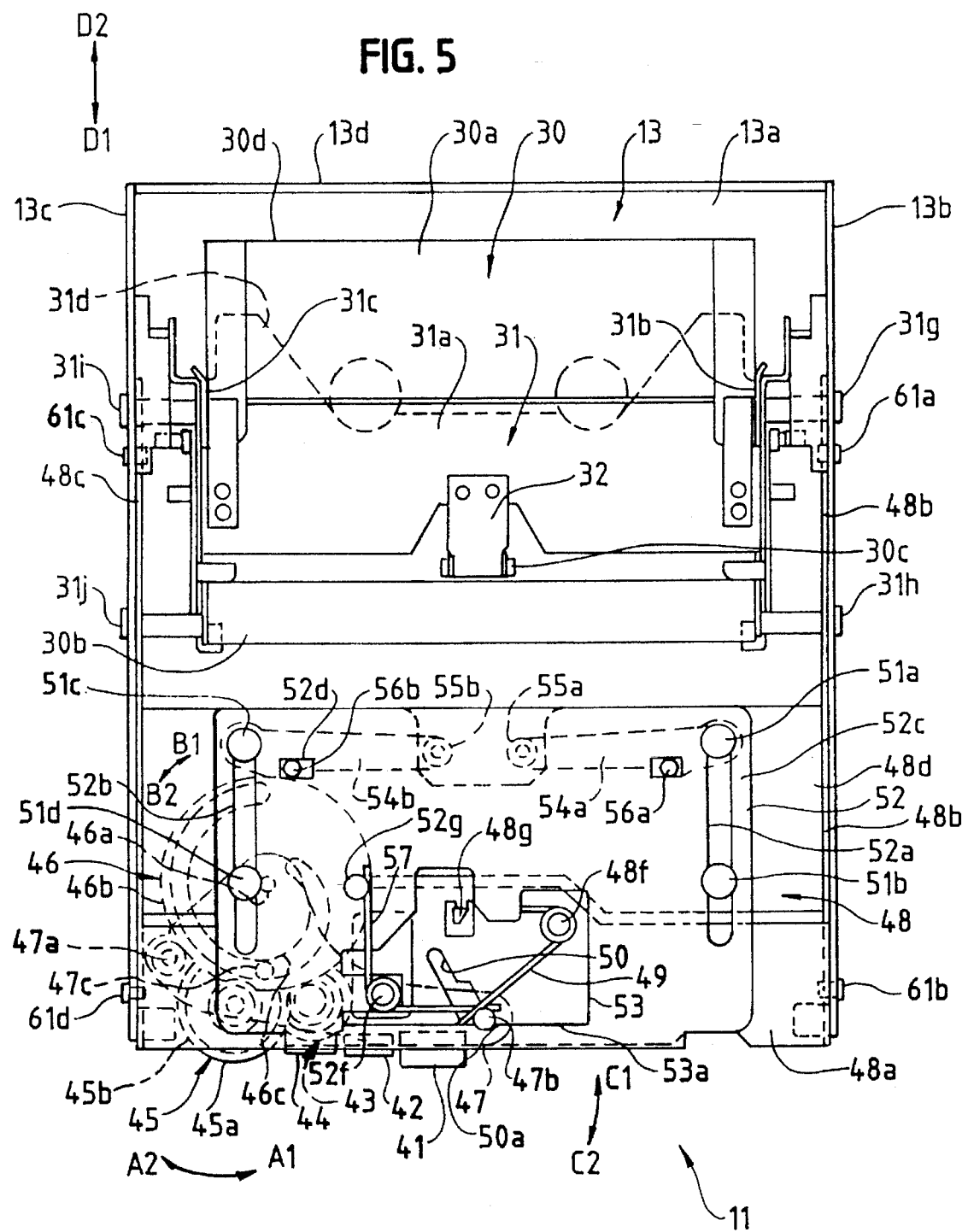
FIGS. 5, 6 and 7 show plan views of the device of FIG. 3 in different states in cassette loading/ejecting procedures.
Figure 6:
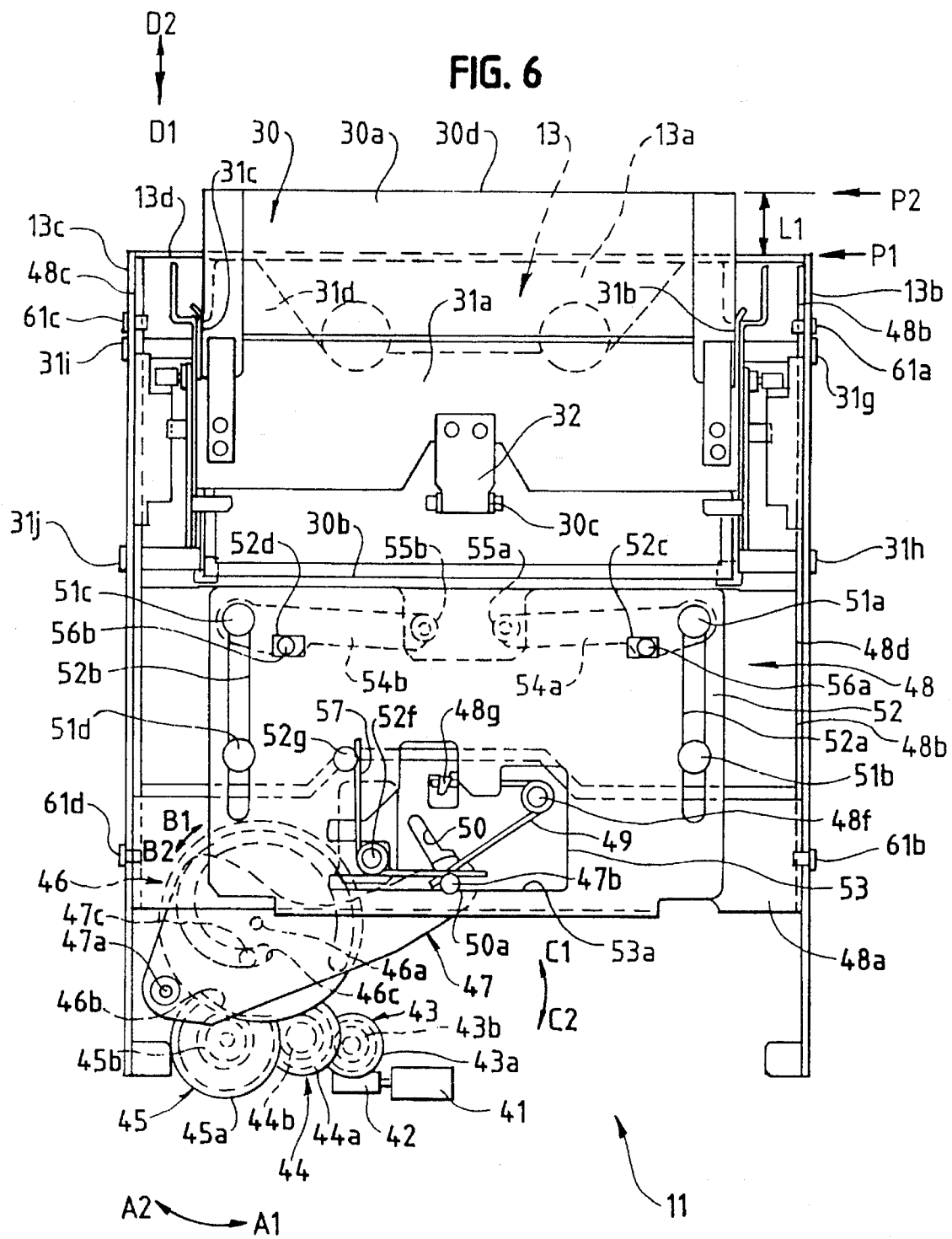

In the above construction, the elastic force of the spring 49 pushes the engaging pin 47b in the $D_1$ direction. The pushing force by means of the spring 49 causes said top plate 48a of the holder driving mechanism unit 48 together with the same mechanism unit 48 to move in the $D_2$ direction so that the $D_1$-direction-end edge 50a of the hole 50 comes into contact with the engaging pin 47b as shown in FIGS. 5 and 6. However, the edge 50a of the hole 50 moves away from the engaging pin 47b in the case where the cassette 30 is in the last stage of the cassette ejecting operation as shown in FIG. 3. Further, the arm driver 52 is pushed by the force of the spring 57 in the $D_2$ direction so that the $D_1$-direction-end edge 53a of the hole 53 normally comes into contact with the engaging pin 47b.

A disc-like mode cam 46 is supported on the chassis 13 and rotates about a shaft 46a below the driving arm 47. A cam groove 46c formed on the top surface of the mode cam 46 extends spirally from a position near the center to a position near the periphery and then extends along a circumferential path near the periphery of the top surface as shown in the figure. An engaging pin 47c projecting downward from the driving arm 47 is inserted into the cam groove 46c. As the cam groove 46c is rotated together with the mode cam 46, the engaging pin 47c is guided by the cam groove 46c and thus moves so that the driving arm 47 is rotated accordingly.

A tooth set 46b is provided on the periphery of the mode cam 46. A tooth set 45b of a gear 45 engages with the tooth set 46b of the mode cam 46. A tooth set 45a of the gear 45 engages with a tooth set 44b of a gear 44. A tooth set 44a of the gear 44 engages with a tooth set 43b of a gear 43. A tooth set 43a of the gear 43 engages with a gear 42 of a mode motor 41.

The above-mentioned tape loading mechanism unit for loading the magnetic tape contained in the tape cassette 30 is driven by a tape-loading cam groove (not shown in the figure) provided on the mode cam 46.

Operation of the above described tape-cassette loading device 11 is now described with reference to FIGS. 3, 5–7.

FIG. 6 shows the state of the tape-cassette loading device 11 where the tape cassette 30 will be inserted into the loading device 11. Before any tape cassette is inserted into the loading device 11, the mode cam 46 and driving arm 47 are in the states as shown in FIG. 6. The position of the holder driving mechanism unit 48 is fixed by the engaging pin 47b against which the top plate 48a of the mechanism unit 48 is pushed in the $D_2$ direction due to the pressing force by the spring 49. The holder driving mechanism unit 48 is in the position where the mechanism unit 48 has arrived at its $D_2$-direction movement-limit position. The engaging pins 61a through 61d are respectively in contact with the $D_2$-direction-end edges of the corresponding guiding holes including the holes 15 and 16 of the chassis-side plates 13b and 13c.

The pressing force of the coil spring 57 causes the $D_1$-direction-end edge 53a of the hole 53 of the arm driver 52 to come into contact with the engaging pin 47b of the driving arm 47. The arm driver 52 is thus held at its $D_1$-direction movement-limit position on the holder driving mechanism unit 48. The ejecting arms 54a and 54b are in the respective positions where the arm 54a has been rotated counterclockwise and the arm 54b has been rotated clockwise. Thus, the rollers 55a and 55b of the arm 54a and 54b are in the positions away from the front edge 30b (lid portion) of the tape cassette 30 which is held in the holder 31 at a predetermined position.

The holder 31 is held by the holder driving mechanism unit 48 so as to be at its $D_2$-direction movement-limit position, namely at a cassette inserting position. There, the engaging pins 31g through 31j of the holder 31 are in the respective positions near the $D_2$-direction-end edges of the corresponding guiding holes including the holes 17 and 18 in the chassis side plates 13b and 13c.

The operator's operation of pushing the tape cassette 30 into the holder 31 results in that a loading grip 30c provided on the top surface of the tape cassette 30 is held by the above-mentioned cassette pressing member 32 of the holder 31 as shown in FIG. 5. Thus, the cassette 30 is held at the predetermined position in the holder 31.

Then, if the operator slightly presses the tape cassette 30 in the $D_1$ direction, the holder 31 moves in the same direction accordingly. This holder 31's movement causes a predetermined mechanism unit (not shown in the figure) to appropriately operate the starting switch of the mode motor 41. The rotation of the mode motor 41 then rotates the mode cam 46 counterclockwise ($B_2$ direction) via the gears 42, 43, 44 and 45. Thus, the engaging pin 47c is guided by the cam groove 46c and as a result the driving arm 47 is rotated clockwise ($C_2$ direction). Accordingly, the edge 50a of the hole 50 in the top plate 48a of the holder driving mechanism unit 48 is pushed by the engaging pin 47b of the driving arm 47 so that the mechanism unit 48 moves in the $D_1$ direction. The arm driver 52 moves in the same direction together with the holder driving mechanism unit 48 as if they are in a unit body because the same engaging pin 47b pushes the edge 53a of the hole 53 in the arm driver 52.

The holder 31 is driven by the holder driving mechanism unit 48, which moves in the $D_1$ direction as mentioned above, so as to carry the tape cassette 30 in the $D_1$ direction, the holder 31 thus arriving at a cassette loaded position. During the period, the engaging pins 31g through 31j respectively move along the corresponding guiding holes including the holes 17 and 18 (each of the four corresponding holes has the right-angled shape as shown in FIG. 4) of the chassis side plates 13b and 13c. Thus, the holder 31 first moves in the $D_1$ direction to the limit and then falls so as to arrive at the cassette loaded position. Thus, the cassette loading operation has been completed. FIG. 5 shows the cassette-loading completion state.

Then, the mode cam 46 is further rotated in the $B_2$ direction so that the above-mentioned tape-loading cam groove of the mode cam 46 drives the tape loading mechanism unit, the tape loading operation being thus performed on the magnetic tape contained in the loaded tape cassette 30. During the tape loading period, the driving arm 47 is maintained in the same state because the part of the cam groove 46 extending along the circumferential path near the periphery of the mode cam 46 maintains the engaging pin 47c at the same position.

In order to eject the thus loaded tape cassette 30, the mode motor 41 is rotated (due to the appropriate operation of the motor starting switch resulting from specification by the operator, for example) in the direction opposite to the direction in which the mode motor 41 is rotated when loading the tape cassette 30. Then, after the tape loading mechanism unit performs the unloading operation on the loaded magnetic tape, the rotation of the mode motor 41 rotates the mode cam 46 via the gears 42, 43, 44 and 45. Thus, the mode cam 46 is rotated in the $B_1$ direction from its state shown in FIG. 5. Thus, the engaging pin 47c is guided by the cam groove 46c so that the driving arm 47 is rotated counterclockwise (in the $C_1$ direction).

The coil spring 49 always causes the edge 50a of the hole 50 in the top plate 48a of the holder driving mechanism unit 48 to be in contact with the engaging pin 47b due to its elastic force, excepting at the above-mentioned last stage of the cassette ejecting operation. This state is maintained during the above rotation of the driving arm 47 so that the counterclockwise ($C_1$-direction) rotation of the driving arm 47 moves the holder 48 in the $D_2$ direction.

Similarly, the coil spring 57 causing the edge 53a of the hole 53 in the arm driver 52 to be in contact with the same engaging pin 48a is maintained. Thus, the arm driver 52 moves together with the holder driving mechanism unit 48 as if they are a unit body.

Thus, the holder 31 moves from the cassette loaded position shown in FIG. 5 to the cassette inserting position shown in FIG. 6. During the movement, the holder 31 is driven by the holder driving mechanism unit 48 and carries the tape cassette 30. During this time, the holder is lifted and then moved in the $D_2$ direction, due to the guiding function performed by the engagement of the engaging pins 31g through 31j with the corresponding guiding holes including the holes 17 and 18 of the chassis side plates 13b and 13c. Then, the movement of the holder driving mechanism unit is stopped because the engaging pins 61a through 61d come into contact with the $D_2$-direction-end edges of the corresponding guiding holes including 15 and 16 of the chassis side plates 13b and 13c.

In the above state, as shown in FIG. 6, the rear edge 30d of the tape cassette 30 projects from the chassis front edge position $P_1$ by a distance $L_1$ so as to be at a position $P_2$.

Figure 7:
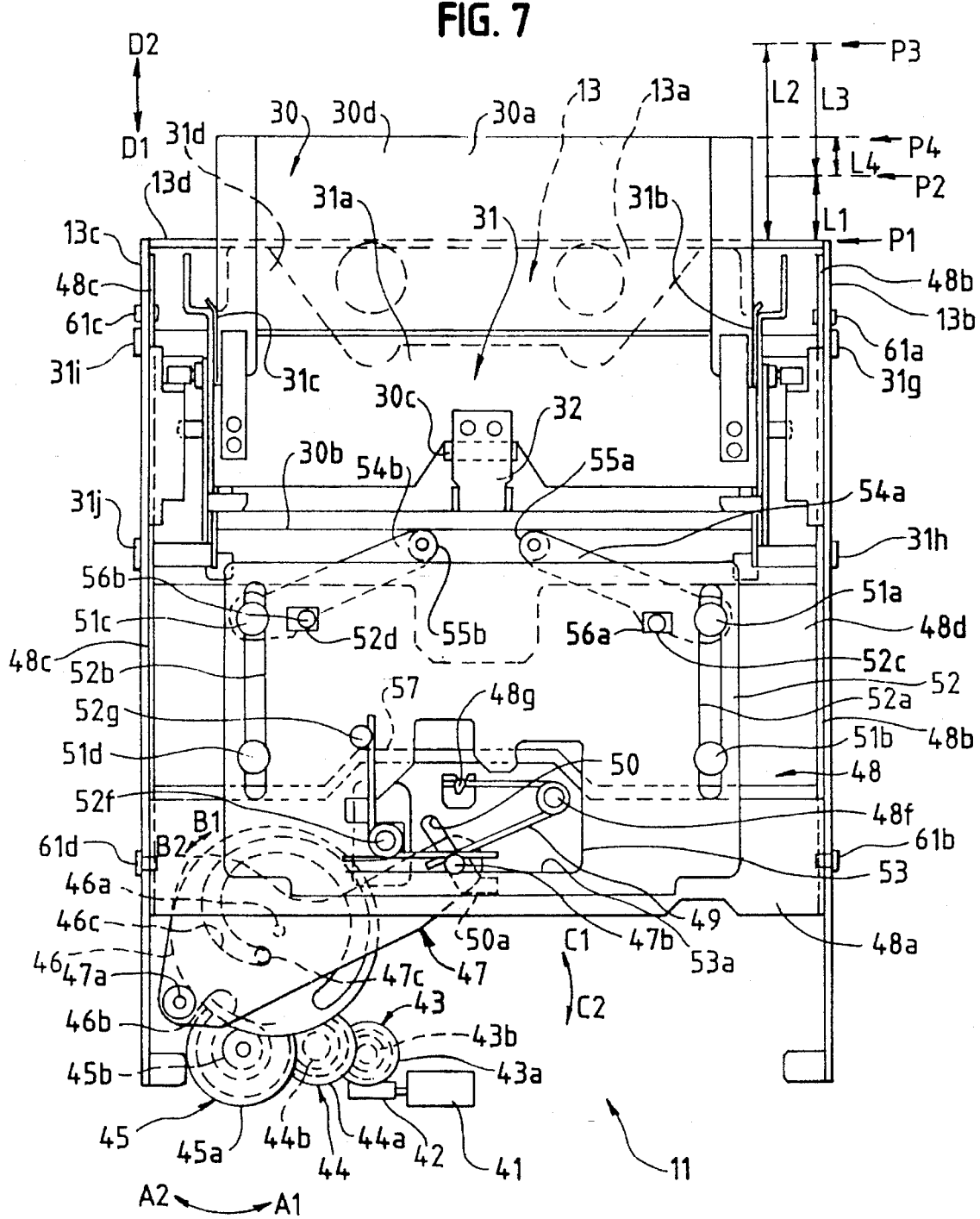

Then, the above-mentioned last stage in the cassette ejecting operation is performed on the tape cassette 30, in which stage the ejecting arms 54a and 54b push the tape cassette 30 from the holder 31 of the loading device 11. FIG. 7 shows the state where the loading device 11 is performing the last stage process and FIG. 3 shows the state where the loading device 11 has completed the last stage process.

During the last stage, the mode motor 41 is rotated so that the mode cam 46 is further rotated in the $B_1$ direction from the state shown in FIG. 6. Thus, the engaging pin 47c is guided by the cam groove 46c so that the driving arm 47 is rotated in the $C_1$ direction from the state shown in FIG. 6.

Since the engaging pins 61a through 61d have already come into contact with the front-end edges of the corresponding guiding holes of the chassis side plates 13b and 13c as mentioned above, the holder driving mechanism unit 48 cannot move further. As a result, only the engaging pin 47b of the driving arm 47 moves in the $D_2$ direction along the hole 50 against the elastic force of the coil spring 49.

On the other hand, since no movement prevention effect controls the movement of the arm driver 52 yet, the coil spring 57 can still maintain the state where the edge 53a of the hole 53 is in contact with the engaging pin 47a. Thus, the arm driver 52 moves in the $D_2$ direction, due to the movement of the engaging pin 47b, on the holder driving mechanism unit 48, the long holes 52a and 52b accordingly moving in the $D_2$ direction as they engage with the shafts 51a and 51c and engaging pins 51b and 51d. Since the holes 52c and 52d also move in the $D_2$ direction as they engage with the engaging pins 56a and 56b of the ejecting arms 54a and 54b, the ejecting arm 54a is rotated clockwise about the shaft 51a and the ejecting arm 54b is rotated about the shaft 51c counterclockwise, accordingly.

Thus, the rollers 55a and 55b of the ejecting arms 54a and 54b respectively come into contact with the front edge 30b of the tape cassette 30 and then push it in the $D_2$ direction. As a result, the tape cassette 30 is pushed from the holder 31 in the same direction. Thus, the operator may easily take out the tape cassette 30 which has been thus pushed and is projecting from the housing of the DAT including the loading device 11.

With reference to FIG. 7, the tape cassette 30 is pushed so as to be in the position where the rear edge 30d of the cassette 30 projects from the chassis front edge position $P_1$ by the distance $L_1$ (see FIG. 6) and another distance $L_4$. In other words, the rear edge 30d of the cassette 30 is located at a position $P_4$ as a result of the movement of the cassette 30, from the state where the cassette 30 was held at the predetermined position in the holder 31 located at the cassette inserting position and the rear edge 30d was at the $P_2$ position as shown in FIG. 6, by the distance $L_4$.

Then, the mode motor 41 is further rotated so that the mode cam 46 is rotated further in the $B_1$ direction from the state shown in FIG. 7. Thus, through the above-described engagement of the engaging pin 47c with the cam groove 46c, the driving arm 47 is rotated further in the $C_1$ direction from the state shown in FIG. 7. Thus, the engaging pin 47b of the driving arm 47 moves further along the hole 50 of the top plate 48a of the holder driving mechanism unit 48 in the $D_2$ direction.

On the other hand, the same moving engaging pin 47b drives the arm driver 52 on the holder driving mechanism unit 48 in the direction $D_2$ from the state shown in FIG. 7. Thus, the holes 52c and 52d move in the same direction while they engage with the engaging pins 56a and 56b. Thus, similarly to the operation between the states shown in FIGS. 6 and 7 as described above, the ejecting arm 54a and 54b are respectively rotated further clockwise and counterclockwise from the state shown in FIG. 7. Thus, the tape cassette 30 is pushed by the rollers 55a and 55b further from the holder 31 in the $D_2$ direction.

With reference to FIG. 3, the tape cassette 30 has moved as a result of being pushed by a distance $L_3$ from the state shown in FIG. 6 where the cassette 30 was at the predetermined position in the holder 31. Thus, the rear edge 30d of the cassette 30 has arrived at a $P_3$ position as a result of moving by the distance $L_3$ from the position $P_2$. The projecting distance $L_2$ of the rear edge 30d on the cassette 30 from the chassis front edge results from adding the projecting distance $L_1$ where the cassette 30 was at the predetermined position in the holder 31 with the pushing distance $L_3$.

Then, a predetermined position detecting function detects that the loading device 11 has arrived at the state shown in FIG. 3 so as to stop the rotation of the mode motor 41. Then, a predetermined state returning function automatically causes the mode motor to be rotated in reverse so that the state of the device 11 is returned to the state shown in FIG. 5.

Thus, in the tape-cassette loading device 11 in the embodiment of the case loading device according to the present invention, the mode motor 41 runs at a fixed speed. As a result, the ejecting arms 54a and 54b are rotated at an approximately fixed rotation speed in the last stage of the cassette ejecting operation. Thus, in comparison to the case where a spring's elastic force is used to push the tape cassette from the holder, tape cassette 30 may be pushed so as to project from the DAT gently and smoothly by a distance long enough that the operator may easily grasp the cassette with his or her fingers so as to take it out.

Further, the pushing distance $L_3$ shown in FIG. 7 may be easily adjusted by adjusting the rotation angle of the ejecting arms 54a and 54b by adjusting the rotation angle of the mode cam 46.

Further, the tape-cassette 30 pushing speed may also be easily adjusted by adjusting any of the rotation speed of the mode motor 41, the gear ratios of the gears 42 through 45, the number of teeth on the mode cam 46, and so forth.

The application of the present invention is not limited to a DAT such as that described above and the present invention may be applied to various apparatuses handling cases such as a video tape cassette, audio tape cassette, and so forth.

Further, the present invention is not limited to the above described embodiments, and variations and modifications may be made without departing from the scope of the present invention.

What is claimed is:

1. A case loading device comprising:

a holder mechanism unit for holding a case;

a driving mechanism unit for driving said holder mechanism unit so as to cause said holder mechanism unit to convey said case between a first loaded position and a second unloaded position; and an arm for moving further said case from said second unloaded position to a third ejected position in an ejecting direction opposite to an inserting direction from said second position to said first position as a result of being driven by said driving mechanism unit.

2. The case loading device according to claim 1, further comprising an arm driving member for driving said arm to move said case from said second position to said third position as a result of being driven by said driving mechanism unit.

3. The case loading device according to claim 2, further comprising a switching mechanism unit for controlling the action of said holder mechanism unit and said arm driving member so that said driving mechanism unit may drive both said holder mechanism unit and said arm driving member while said holder mechanism unit is in the state where said holder mechanism unit may convey said case between said first and second positions; and said driving mechanism unit may drive only said arm driving member while said holder mechanism unit is in the state where said holder mechanism unit may convey said case between said second and third positions.

4. The case loading device according to claim 2, wherein said holder mechanism unit comprises:

a holder for directly supporting and then conveying said case; and a holder driving member for driving said holder as a result of being driven by said driving mechanism unit;

and wherein said arm is rotatably supported on said holder driving member.

5. The case loading device according to claim 1, wherein:

said case encases an information storing medium therein;

said second position is such that the case may be placed at said second position in said case loading device by an operator;

said first position is one such that information is written on or is read from said information storing medium while said case is positioned at said first position; and said third position is one such that an operator may remove the case from said case loading device if said case is positioned at said third position.

6. The case loading device according to claim 1, wherein said holder mechanism unit comprises:

a holder for directly supporting and then conveying said case;

a holder driving member for driving said holder as a result of being driven by said driving mechanism unit; and a up/down mechanism unit for shifting the height of said holder while said driving mechanism unit moves said holder between said first and second positions.

7. The case loading device according to claim 1, further comprising shock absorbing means for absorbing a shock which may be applied to said holder mechanism unit and an arm driving member for driving said arm while said driving mechanism unit drives said holder mechanism unit and said arm driving member.

8. The case loading device according to claim 1, wherein said driving mechanism unit includes an electric motor which generates the driving force of said driving mechanism unit.

9. A case loading device comprising a holder mechanism unit for holding a case; a driving mechanism unit for driving said holder mechanism unit so as to cause said holder mechanism unit to convey said case between a first loaded position and a second unloaded position; an arm for moving further said case from said second unloaded position to a third ejected position in an ejecting direction opposite to an inserting direction from said second position to said first position; an arm driving member for driving said arm to move said case from said second position to said third position as a result of being driven by said driving mechanism unit; and shock absorbing means for absorbing a shock which may be applied to said holder mechanism unit and said arm driving member while said driving mechanism unit drives said holder mechanism unit and said arm driving member.

10. A case loading device comprising:

a holder mechanism unit for holding a case;

a driving mechanism unit for driving said holder mechanism unit so as to cause said holder mechanism unit to convey said case between a first loaded position and a second unloaded position;

an arm for moving further said case from said second unloaded position to a third ejected position in an ejecting direction opposite to an inserting direction from said second position to said first position;

an arm driving member for driving said arm to move said case from said second position to said third position as a result of being driven by said driving mechanism unit;

a switching mechanism unit for controlling the action of said holder mechanism unit and said arm driving member so that said driving mechanism unit may drive both said holder mechanism unit and said arm driving member while said holder mechanism unit is in the state where said holder mechanism unit may convey said case between said first and second positions, and said driving mechanism unit may drive only said arm driving member while said holder mechanism unit is in the state where said holder mechanism unit may convey said case between said second and third positions;

preventing means for preventing said holder mechanism unit from conveying said case between said second position and said third position; and absorbing means for absorbing the driving force applied to said holder mechanism unit by said driving mechanism unit while said holder mechanism unit is in the state where said holder mechanism unit may convey said case between said second and third positions.

* * * * *